(12) United States Patent
Srinivasan et al.

(10) Patent No.: US 12,417,331 B2
(45) Date of Patent: Sep. 16, 2025

(54) SYSTEMS AND METHODS FOR CIRCUIT DESIGN DEPENDENT PROGRAMMABLE MAXIMUM JUNCTION TEMPERATURES

(71) Applicant: Intel Corporation, Santa Clara, CA (US)

(72) Inventors: Archanna Srinivasan, San Jose, CA (US); Rajiv Mongia, Portland, OR (US); Ravi Gutala, San Jose, CA (US); Kaushik Chanda, San Jose, CA (US); Gurvinder Tiwana, Toronto (CA); Vadali Mahadev, San Jose, CA (US); Mahesh A. Iyer, Fremont, CA (US)

(73) Assignee: Altera Corporation, San Jose, CA (US)

( * ) Notice: Subject to any disclaimer, the term of this patent is extended or adjusted under 35 U.S.C. 154(b) by 849 days.

(21) Appl. No.: 17/481,038

(22) Filed: Sep. 21, 2021

(65) Prior Publication Data

US 2022/0004688 A1 Jan. 6, 2022

(51) Int. Cl.
*G06F 30/337* (2020.01)
*G06F 30/343* (2020.01)
*G06F 119/08* (2020.01)

(52) U.S. Cl.
CPC .......... *G06F 30/337* (2020.01); *G06F 30/343* (2020.01); *G06F 2119/08* (2020.01)

(58) Field of Classification Search
USPC ......................................................... 716/112
See application file for complete search history.

(56) References Cited

U.S. PATENT DOCUMENTS

| | | | |
|---|---|---|---|
| 6,389,582 B1 * | 5/2002 | Valainis | G06F 30/392 165/185 |
| 7,210,115 B1 | 4/2007 | Rahim et al. | |
| 9,047,429 B2 | 6/2015 | He et al. | |
| 2012/0314374 A1 * | 12/2012 | Elkaslassy | H05K 7/209 361/720 |
| 2019/0043737 A1 | 2/2019 | Hutton | |
| 2022/0215147 A1 | 7/2022 | Lim et al. | |

OTHER PUBLICATIONS

European Patent Office, Extended European Search Report and European Search Opinion for European patent application 22181837.0 dated Dec. 16, 2022.

* cited by examiner

*Primary Examiner* — Bryce M Aisaka
(74) *Attorney, Agent, or Firm* — InventIQ Legal LLP; Steven J. Cahill

(57) ABSTRACT

Systems and methods are provided for generating a circuit design for an integrated circuit using a circuit design tool. The circuit design tool determines maximum junction temperatures for circuit blocks in the circuit design for the integrated circuit. The circuit design tool determines defects values for the circuit blocks using the maximum junction temperatures for the circuit blocks. The circuit design tool determines a defects value for the circuit design based on the defects values for the circuit blocks. The circuit design tool determines a maximum junction temperature for the circuit design based on a comparison between the defects value for the circuit design and a target defects value for the circuit design. The circuit design tool can dynamically reconfigure configurable logic circuit blocks to improve the power, the performance, and the thermal profile to achieve an optimal junction temperature per circuit block.

20 Claims, 8 Drawing Sheets

SYSTEMS AND METHODS FOR CIRCUIT DESIGN DEPENDENT PROGRAMMABLE MAXIMUM JUNCTION TEMPERATURES

FIELD OF THE DISCLOSURE

The present disclosure relates to designing electronic integrated circuits, and more particularly, to systems and methods for circuit design dependent programmable maximum junction temperatures.

BACKGROUND

Some users of integrated circuits (ICs), such as field programmable gate arrays (FPGAs), have stringent use requirements for the ICs, including the amount of time the ICs will be in use and the maximum temperatures that the ICs will generate while in use. Manufacturers of ICs often do not know in advance which of their ICs will experience the maximum environmental stresses (e.g., the highest temperatures for the longest periods of time), while being used in specific customer applications.

Reliability closure of a circuit design for an FPGA often assumes that the entirety of the FPGA circuitry operates in an always-on state at a high junction temperature for several years, even though in reality this is rarely the case. Assumptions for temperature and power usage of an FPGA may make it difficult to meet higher bandwidth and frequency targets for a circuit design for the FPGA. Often, IC die size needs to be increased or buffers on the FPGA need to be made larger to meet reliability targets for the FPGA. Also, a customer may have to use costly thermal solutions for an FPGA in order to maintain the junction temperature below a maximum value.

DETAILED DESCRIPTION

Figure 1:
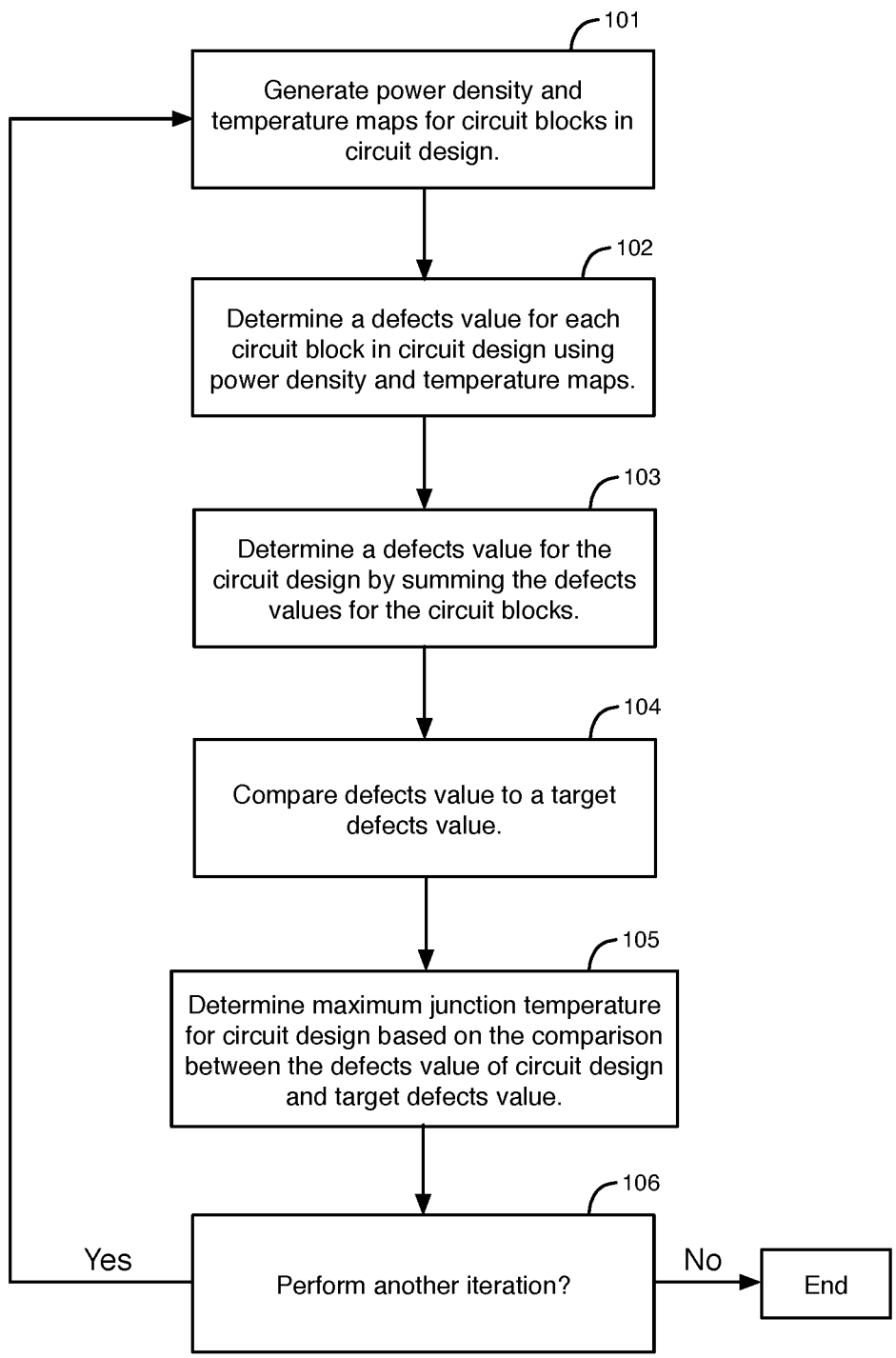
FIG. 1 is a flow chart that illustrates examples of operations that can be performed to determine a maximum junction temperature for a circuit design for an integrated circuit (IC), according to an embodiment.

Field programmable gate arrays (FPGAs) are often designed using stringent use conditions for meeting reliability requirements at full performance. For example, usage conditions for an FPGA may assume that the entirety of the FPGA circuitry will be on 100% of the time for 11.4 years at a temperature of 100° C. To assess the reliability of an FPGA, designers typically assume a series of worst case conditions along with a derating assumption that considers the most extreme users of the FPGA. As a result of having to meet these extreme user reliability requirements for continuous operation (e.g., always on at 100° C. for 11.4 years), the die size of the FPGA needs to be large enough to accommodate extra metal in order to satisfy electromagnetic rules, rules regarding the number of defects per unit area in the die, power requirements, and maximum junction temperature requirements, which add to the cost and design time of the FPGA integrated circuit die. These assumptions regarding the worst case conditions may be overly conservative for the vast majority of users of an FPGA.

According to some embodiments disclosed herein, the reliability of an integrated circuit (IC), such as an FPGA, is determined based on the anticipated use conditions for the IC. As a result, the design requirements for the IC can be reduced in order to reduce the cost of the IC, to increase IC performance, and to improve the thermal and power capability of the IC. According to these embodiments, a reliability evaluation rate (e.g., a defects rate) is determined for each user design for an IC and for each use case of the IC, thereby reducing the assumptions regarding the conditions that the IC will operate in. Typically, the worst case conditions regarding power usage, defects rate, and maximum junction temperature can be significantly reduced for many circuit designs of an IC. As a result, the die area and the design cost of the IC can be reduced, and the thermal and power capabilities of the IC can be improved.

In some embodiments, a design-specific reliability calculation is performed at a granular level across an IC die by determining the temperature and power generated by individual circuit blocks within a circuit design for the IC die. A defects rate is then determined for each circuit block within the circuit design, and a defects rate for the entire IC die is determined based on the defects rates of the circuit blocks. In this context, the defects rate may refer to defects in circuits, such as transistors, caused by electromigration due to the effects of aging. A maximum junction temperature is then determined for the IC die based on the defects rate for the entire IC die for the desired lifetime. The circuit design may then be modified to adjust the maximum junction temperature for the IC die, until a desired defects rate is achieved for a specific use scenario of the IC die, including the lifetime and on-time percentage of the IC die. In some embodiments in which the IC die is a programmable logic device such as an FPGA, the placement and routing of the user design may be changed to reduce the thermal and power density in hot spots of the circuit design and/or to reduce defects rates in portions of the circuit design, while maintaining placement and routing requirements for the circuit design.

According to some embodiments, a reliability calculator in a circuit design tool is used to generate a maximum junction temperature for an IC that is specific to a circuit design for the IC and is specific to expected usage conditions for the IC. The reliability calculator obviates the need to design the IC to accommodate assumptions regarding the worst case usage conditions for the IC. A reliability function can be created for the power usage and temperature of the IC at a granular level across the IC die, at the subsystem level, or at the level of circuit blocks within the IC. This approach allows a substantially reduced maximum junction temperature to be used for a circuit design for an IC that increases the power, thermal rating, and the performance capability during specific usage conditions of the IC. These embodiments can reduce IC design cost and effort and reduce the time to market for an IC by having a faster turnaround time to manufacture the IC without exceeding a desired defects rate. The reduced maximum junction temperature may increase the power, thermal rating, and the performance capability for the vast majority of users of an IC, because overly conservative reliability usage conditions are not assumed for all users of the IC. These embodiments can also be used to distribute the effects of aging of an IC die across the IC die by distributing active portions of the circuit design to less used regions of the IC die.

In a conventional reliability approach for an IC or IC package, an assumption is made that all parts of the IC or IC package run at the same junction temperature and the same maximum power conditions when calculating a defects value for the IC or package. According to various embodiments disclosed herein, different portions of an IC may operate at different temperatures and power levels, allowing for a reliability calculation at the different operating conditions. Reliability (e.g., a defects value) for an IC is calculated using the power and temperature distribution in the IC. As a result, large portions of the IC can run significantly below the maximum junction temperature for the IC, resulting in a substantial reduction in the defects value for the IC. The maximum junction temperature for a circuit design for the IC can be increased until a desired defects value for the circuit design is reached, resulting in more power usage, a higher thermal limit, and more performance capability for the circuit design.

FIG. 1 is a flow chart that illustrates examples of operations that can be performed to determine a maximum junction temperature for a circuit design for an integrated circuit (IC), according to an embodiment. In operation 101, a circuit design tool generates power density and temperature maps for circuit blocks in a circuit design for an integrated circuit (IC). The circuit design may be divided into any desired level of granularity to identify the circuit blocks that are evaluated to generate the power density and temperature maps for the circuit design in operation 101. Each of the circuit blocks may, for example, include an adjacent group of circuits having similar power usage requirements. The power density map for the circuit design shows the distribution of power usage in the circuit blocks during the expected usage conditions for the circuit design. The temperature map for the circuit design shows the distribution of temperature in the circuit blocks during the expected usage conditions for the circuit design.

In operation 102, the circuit design tool determines a defects value for each circuit block in the circuit design using the power density map and the temperature map generated for the circuit blocks in the circuit design. Each of the circuit blocks may be any size and may include multiple smaller circuits within the circuit design. The defects value determined for each circuit block in the circuit design in operation 102 may, for example, be a defects per unit value that indicates defects at the circuit level (e.g., defects per million circuits).

In operation 103, the circuit design tool determines a defects value for the circuit design for the IC by summing the defects values for all of the circuit blocks in the circuit design that were determined in operation 102. The defects value determined for each circuit block represents the total contribution of the circuit block to the defects in the entire circuit design. In operation 104, the circuit design tool compares the defects value that was determined for the circuit design in operation 103 to a target defects value. The target defects value may be a defects per unit value that is selected for the IC or for the circuit design (e.g. 10,000 defects per million circuits).

In operation 105, the circuit design tool determines a maximum junction temperature for the circuit design based on the comparison in operation 104 between the defects value of the circuit design and the target defects value for the circuit design. In operation 105, the circuit design tool may adjust the maximum junction temperature for the circuit design based on the comparison between the defects value of the circuit design and the target defects value for the circuit design. For example, if the defects value for the circuit design is less than the target defects value, then the circuit design tool increases the maximum junction temperature in operation 105. If the defects value for the circuit design is greater than the target defects value, then the circuit design tool decreases the maximum junction temperature in operation 105. The maximum junction temperature may, for example, refer to a maximum P-N junction temperature for transistors in the IC. In operation 106, the circuit design tool decides whether to perform another iteration of operations 101-105. If another iteration of the operations of FIG. 1 is to be performed, the circuit design tool returns to operation 101. If another iteration of the operations of FIG. 1 is not to be performed, the process of FIG. 1 ends.

Figure 2:
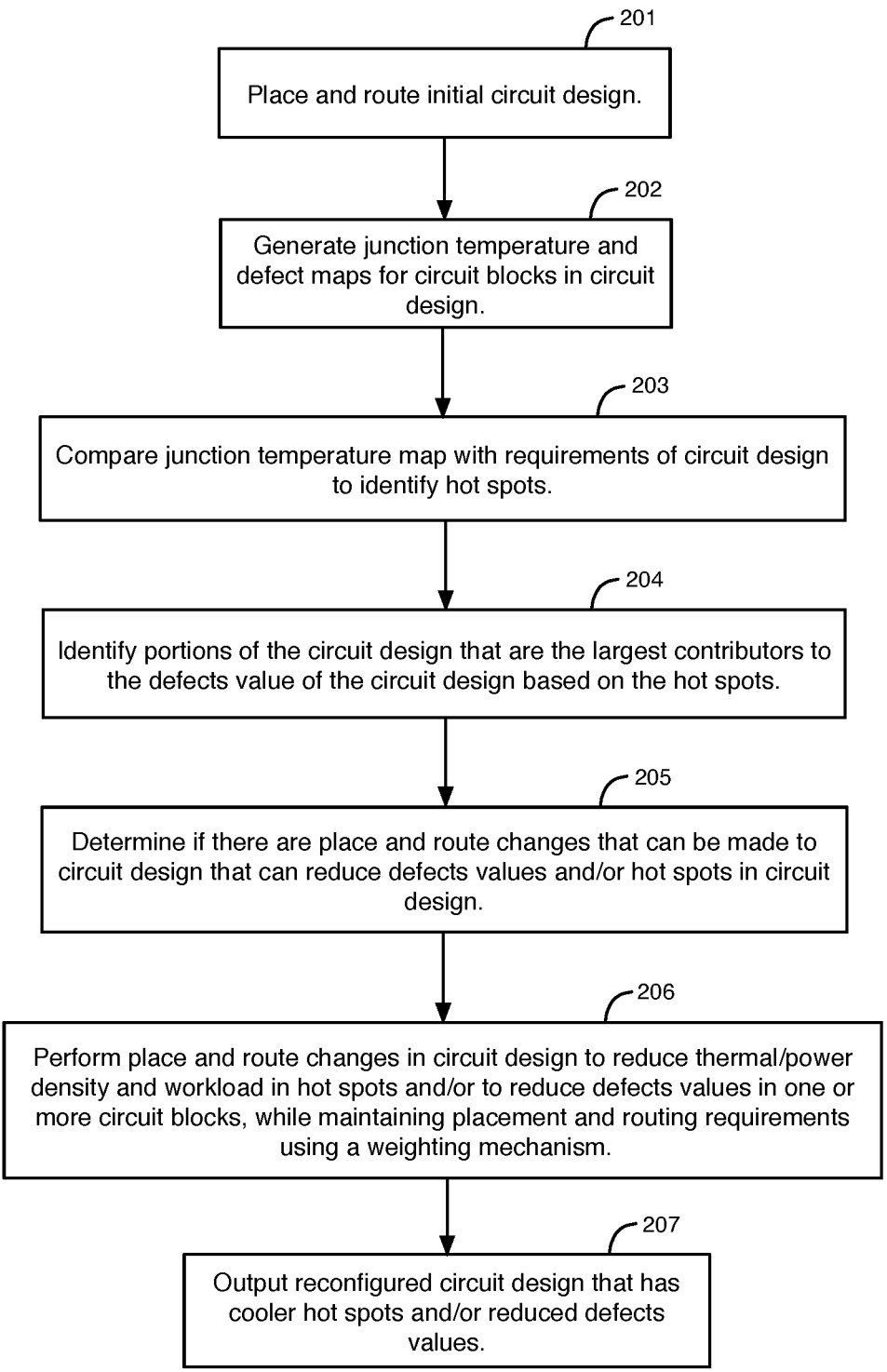
FIG. 2 is a flow chart that illustrates examples of operations that can be performed to modify a circuit design for an integrated circuit (IC) to adjust the maximum junction temperature for the IC until a desired defects rate is achieved for expected usage conditions of the IC, according to an embodiment.

FIG. 2 is a flow chart that illustrates examples of operations that can be performed to modify a circuit design for an integrated circuit (IC) to adjust the maximum junction temperature for the IC until a desired defects rate is achieved for expected usage conditions of the IC, according to an embodiment. In operation 201, a circuit design tool places and routes a circuit design for an integrated circuit (IC). The IC may be any type of IC, such as, for example, a microprocessor IC, a programmable logic IC such as an FPGA, a graphics processing unit IC, or an application specific IC. In operation 202, the circuit design tool generates a junction temperature map and a defects map for circuit blocks in the circuit design for the IC. A non-uniform temperature distribution in the circuit design may make the IC more difficult to cool, because hot spots in the circuit design drive the cooling requirements for the IC. In operation 203, the circuit design tool compares the junction temperature map for the circuit design with the requirements of the circuit design to identify hot spots in the circuit design. The requirements of the circuit design may, for example, be user specified requirements.

In operation 204, the circuit design tool identifies portions of the circuit design that are the largest contributors to the defects value of the circuit design and/or the circuit blocks that have larger defects values based on the hot spots. In operation 205, the circuit design tool determines if there are place and route changes that can be made to the circuit design that can reduce the defects values and/or hot spots in the circuit design. The circuit design tool uses information about the hot spots in the circuit design to apply additional routing rules that are derived from the analysis of the thermal characteristics of the circuit design. In operation 206, the circuit design tool performs place and route changes in the circuit design to reduce the thermal and power density and the workload in hot spots in the circuit design and/or to reduce defects values in one or more circuit blocks in the circuit design, while maintaining placement and routing requirements using a weighting mechanism. The circuit design tool may, for example, move one or more circuit blocks and/or wires in the circuit design using place and route tools from hot spots in the circuit design to regions of the IC that are less used to reduce defects values and/or hot spots. The circuit design tool maintains placement and routing requirements for the circuit design and the IC for the movements made during operation 206.

The circuit design tool uses a weighting mechanism in operation 206 that quantifies how placement and routing decisions impact the overall power and thermal density of the circuit design for the IC. The weighting mechanism in balance with other weighting factors, attempts to minimize the thermal and power density in the circuit design while maintaining other placement and routing requirements by adjusting the placement and routing of the circuit design. In a programmable logic IC such as an FPGA, operation 206 may, for example, be performed using fast partial reconfiguration of the circuit design. In operation 207, the circuit design tool outputs a reconfigured circuit design that has cooler hot spots and/or reduced defects values, and is therefore easier to cool than the initial circuit design that was placed and routed in operation 201.

With the capability built into the circuit design tool to implement the operations of FIGS. 1-2, the circuit design tool can relocate regions of a circuit design for an IC that generate higher defects rates. With this information, the circuit design tool can determine different configurations for a circuit design where portions of the circuit design that age the most are shifted in both the logical and physical space within the IC. These multiple different configurations for the circuit design can then be implemented on the IC at different times in order to generate more even aging in the circuits across the IC. In some embodiments that are referred to herein as fixed design hopping, the IC is reconfigured regularly either at repeating time intervals or at intervals that are runtime based (e.g., using partial reconfiguration). By regularly reconfiguring the IC, the effects of aging in the IC are more evenly distributed across the IC. The circuit design tool can use place and route and partial reconfiguration to dynamically adjust the junction temperature, aging, power density, performance, and thermal hot spots in the IC. In addition, the reconfiguration rate can be variable from seconds to years.

A possible disadvantage of the fixed design hopping embodiments is that these embodiments use an assumption that the IC is aging according to expectations. However, if the IC does not age according to expectations, then the IC may be reconfigured more often than necessary, and as a result, the performance of the circuit design for the IC may be reduced more than necessary. The aging effects in an IC generally depend on the thermal boundary conditions and the workload of the IC over time.

According to other embodiments referred to herein as adaptive design hopping, the IC or circuit design tool tracks the temperature and power usage across the IC over time and calculates the actual aging characteristics of the IC over time. The IC or circuit design tool can then determine the best time to change the circuit design to attempt to slow or mitigate the effects of aging in the IC based on the calculated aging characteristics. The IC is reconfigured to a different configuration each time the aging characteristics of the IC reach predefined limits. In some embodiments, the IC can alert a user that the IC is starting to reach a critical age, so that the user can make maintenance and/or service decisions regarding the IC. The user can, for example, start to overcool the IC in order to slow the aging effects in the IC, until the IC can be reconfigured to reduce the effects of aging. In some embodiments, the temperature and power distribution in the IC or package can be monitored spatially and may be measured to be uneven (either due to design or specific thermal package boundary conditions), and the device can determine where aging is more pronounced.

Each circuit block in a circuit design for an IC has a defects per unit function. The circuit design tool uses the defects per unit function of each circuit block in the circuit design to calculate the defects contribution of the circuit block as a function of the power consumption, maximum junction temperature, on-time, and lifetime operability requirements of the circuit block (e.g., in operations 102 and 202). The circuit design tool can calculate the maximum junction temperature and power usage for each circuit block in an IC based on the expected usage of the circuit design for the IC (e.g., in operations 101 and 202). The circuit design tool can calculate the defects per unit for each circuit block (based on the maximum junction temperature and the expected power usage of the circuit block) for different applications and usage conditions of the circuit design. The circuit design tool then statistically sums the individual defects per unit values for the circuit blocks to achieve a total defects per unit value of the circuit design.

Figure 3:
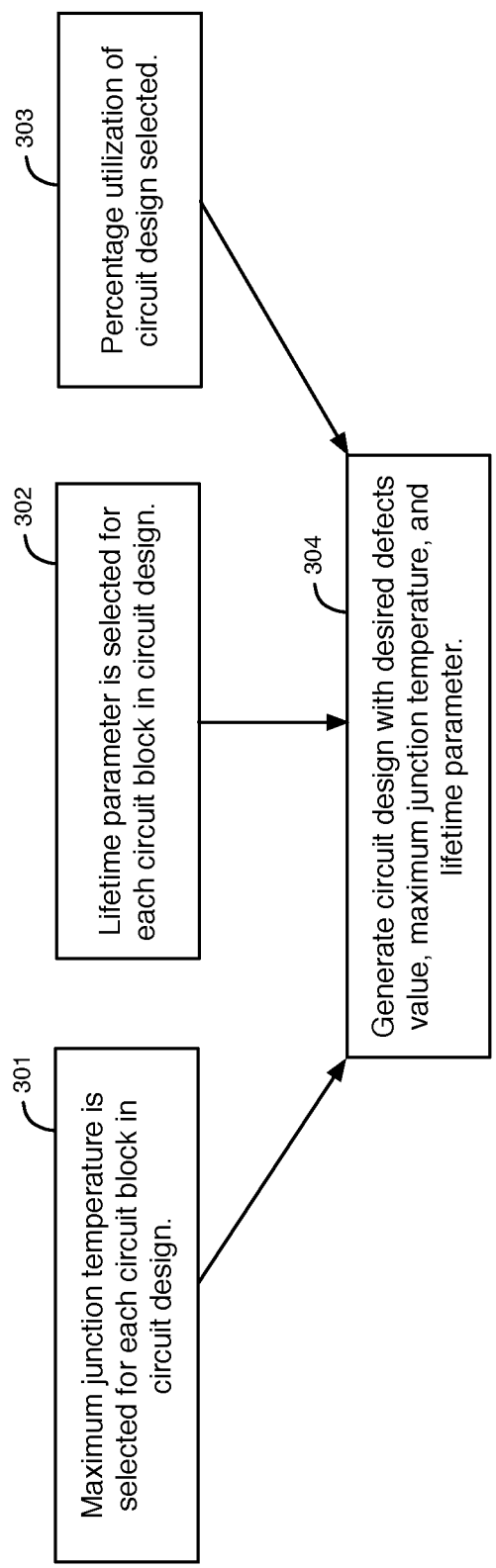
FIG. 3 is a diagram that illustrates how operation parameters for a circuit design for an integrated circuit (IC) can be selected to achieve desired values for the junction temperature, lifetime, and utilization of the IC, according to an embodiment.

Using these calculations, a desired defects value can be achieved for the circuit design for a desired lifetime of the IC. These calculations can be used to remove all overly conservative guard-bands for a particular use case of the IC. FIG. 3 is a diagram that illustrates how operation parameters for a circuit design for an integrated circuit (IC) can be selected to achieve desired values for the maximum junction temperature, lifetime, and utilization percentage of the IC, according to an embodiment. In operation 301, a maximum junction temperature is selected for each circuit block in a circuit design for an integrated circuit (IC) according to user requirements. In operation 302, a lifetime parameter is selected for each circuit block in the circuit design for the IC according to user requirements (e.g., in years of expected use). In operation 303, the percentage utilization of the circuit design is selected (e.g., 100% on, 80% on, 60% on, etc.). In operation 304, the circuit design tool generates a circuit design for the IC with a desired defects value, maximum junction temperature, and lifetime parameter that is valid for particular usage conditions of the IC.

The processes disclosed herein, for example, with respect to FIGS. 1-3 can be applied to ICs that are in 2.5 dimensional (2.5D) and 3 dimensional (3D) integrated circuit (IC) packages. The circuit design tool can iteratively calculate the temperature and power distribution across an IC package. Also, a defects value function can be derived as a function of the temperature and power usage for any circuit block within an IC package. The circuit design tool can calculate a defects value for an entire IC package for specific usage conditions of the IC package.

Figure 4:
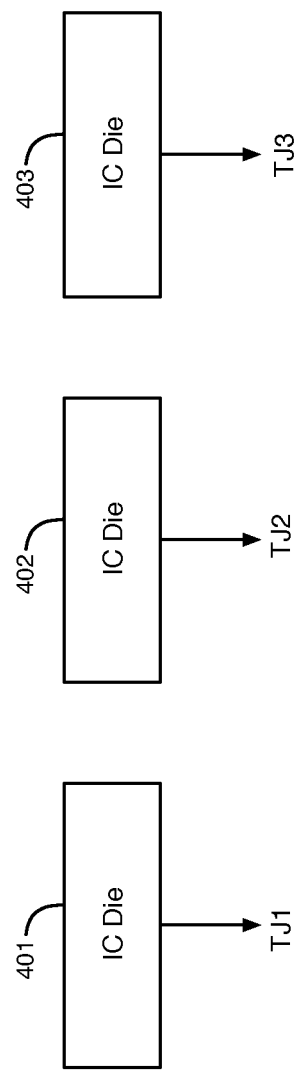
FIG. 4 illustrates an example of an integrated circuit (IC) package that contains 3 integrated circuit (IC) dies that are independently programmable to operate at different maximum junction temperatures, according to an embodiment.

FIG. 4 illustrates an example of an integrated circuit (IC) package that contains 3 integrated circuit (IC) dies 401-403 that are independently programmable to operate at different maximum junction temperatures, according to an embodiment. In the embodiment of FIG. 4, IC dies 401, 402, and 403 are programmable to operate at maximum junction temperatures of TJ1, TJ2, and TJ3, respectively. Signals indicating the maximum junction temperatures TJ1, TJ2, and TJ3 are output from IC dies 401-403, respectively, as shown in FIG. 4. Circuitry in the IC dies 401-403 can determine the maximum junction temperatures TJ1, TJ2, and TJ3, respectively, using, for example, the operations of FIG. 1. The maximum junction temperatures TJ1, TJ2, and TJ3 may be, for example, different temperatures. In some exemplary embodiments, IC dies 401-403 may be vertically stacked with each other or vertically stacked above or below a main IC die. It should be understood that 3 IC dies 401-403 are shown in FIG. 4 merely as an example. Embodiments disclosed herein can be used in IC packages or systems having any number of IC dies, for example, 2, 4, 5, 6, 7, 8, 9, 10, etc. IC dies, including systems with several dozen IC dies.

In some embodiments, one or more of the IC dies 401-403 of FIG. 4 may be in-package memory IC dies, such as high-bandwidth memory or double-data rate memory dies or 3D stacks. The performance of memory IC dies may be thermally constrained, because the memory IC dies are driven by refresh rates (e.g., as in dynamic random access memory). Based on the workload of the memory IC dies, the maximum junction temperature for one or more of the memory IC dies 401-403 can be relaxed or modified by trading off thermally constrained memory bandwidth and performance with the lifetime parameters for the memory IC dies.

As a specific example that is not intended to be limiting, some types of input/output circuits in integrated circuits consume a very high current in some data transmission modes. Using all of the input/output circuits in an IC in a high current data transmission mode may cause the defects per unit rate of the IC to exceed a maximum defects per unit rate allowed for the IC, if the IC is allowed to operate at a high maximum junction temperature (e.g., 100° C.). By reducing the maximum junction temperature that the IC is allowed to operate at (e.g., to 97.5° C.), then all of the input/output circuits in the IC can operate in the high current data transmission mode without causing the defects per unit rate of the IC to exceed the maximum defects per unit rate allowed for the IC. In this example, the IC does not need to be restricted to only using a few of the input/output circuits in the high current data transmission mode.

According to some embodiments, the circuit design tool can calculate usage parameters for a circuit design for an IC in 3 modes. In the first mode, a user enters desired reliability parameters for the IC into the circuit design tool, such as a desired lifetime that the IC is intended to be used in an always-on state (e.g., 5 years always-on, 3 years always-on, etc.) and an expected ambient temperature that the IC will operate in. The circuit design tool then calculates the minimum cooling solution for the IC and the associated power usage for the application of the IC.

In the second mode, a user enters a desired maximum junction temperature excursion for the IC into the circuit design tool (e.g., 110° C. for 300 hours) and an ambient temperature for the IC. The maximum junction temperature excursion may, for example, be a limited time that the IC is expected to run above the maximum junction temperature for the IC. The circuit design tool then calculates the minimum cooling solution for the IC and the associated power usage for the application of the IC.

In the third mode, the user enters a desired cooling solution into the circuit design tool. The desired cooling solution may have to meet certain constraints (e.g., related to air flow and temperature). The circuit design tool then calculates a maximum reliability value for the IC that can allow the IC to function within desired specifications. In each of these 3 modes, the circuit design tool combines the user's top-down requirements for the IC with the bottom-up power, reliability, and thermal requirements for the IC and performs iterations of the operations of FIG. 1 to calculate a defects per unit value for the circuit design for the IC that meets the defects per unit requirements for the IC. The defects per unit requirements for the IC may be functions of the time that the IC is expected to operate in an always-on state and other user parameters. These embodiments can support multiple applications for an IC by dynamically adjusting the maximum junction temperature for the IC based on the performance, power usage, and thermal and reliability requirements for each application of the IC.

Figure 5:
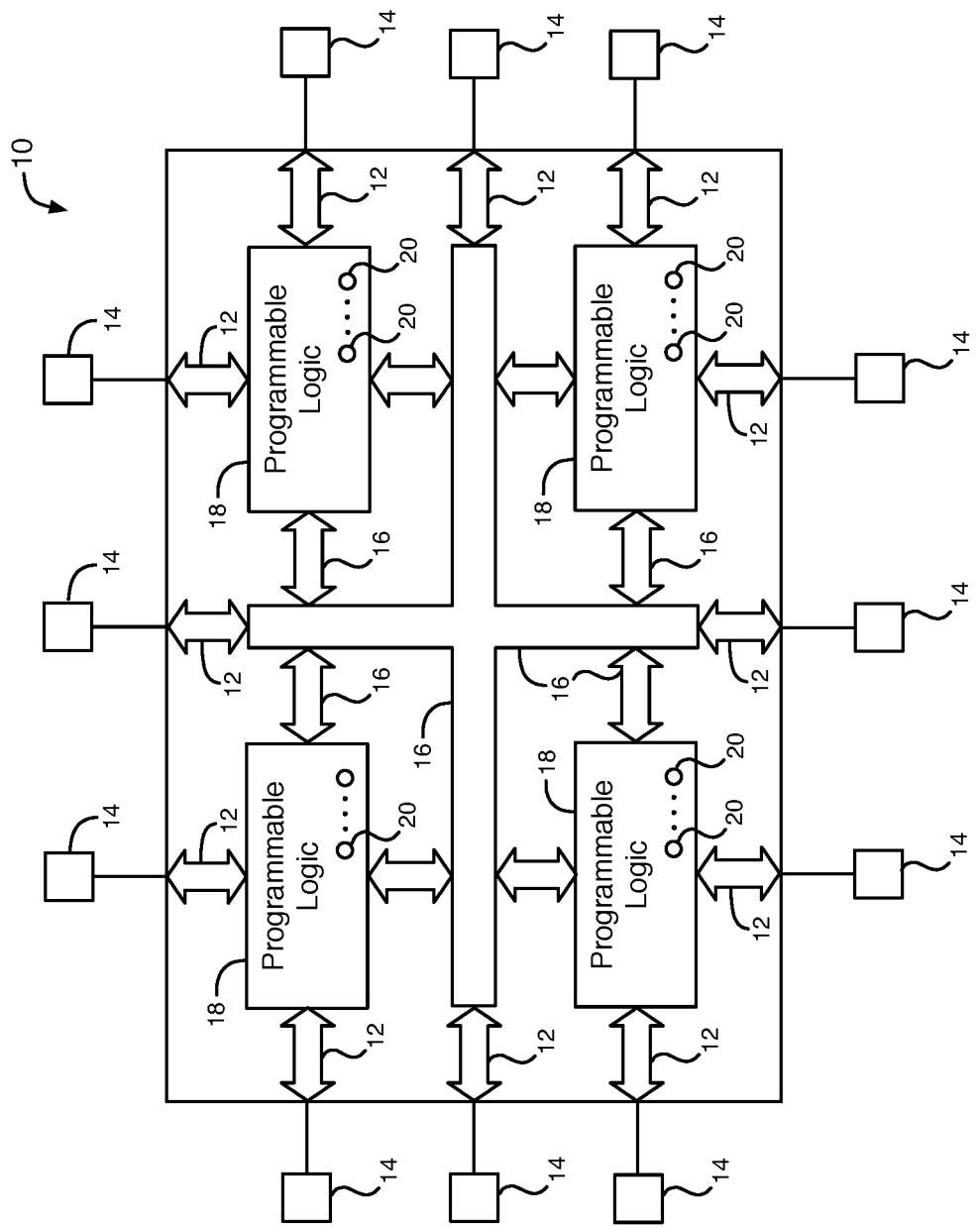
FIG. 5 is a diagram of an illustrative programmable integrated circuit in accordance with an embodiment.

An illustrative programmable logic integrated circuit (IC) 10 is shown in FIG. 5. As shown in FIG. 5, programmable logic integrated circuit 10 may have input-output circuitry 12 for driving signals off of IC 10 and for receiving signals from other devices via input-output pads 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. The programmable logic 18 may be configured to perform custom logic functions.

Programmable logic IC 10 contains memory elements 20 that can be loaded with configuration data (also called programming data) using pads 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. In the context of programmable integrated circuits, the memory elements 20 store configuration data and are sometimes referred to as configuration random-access memory (CRAM) cells.

Figure 6:
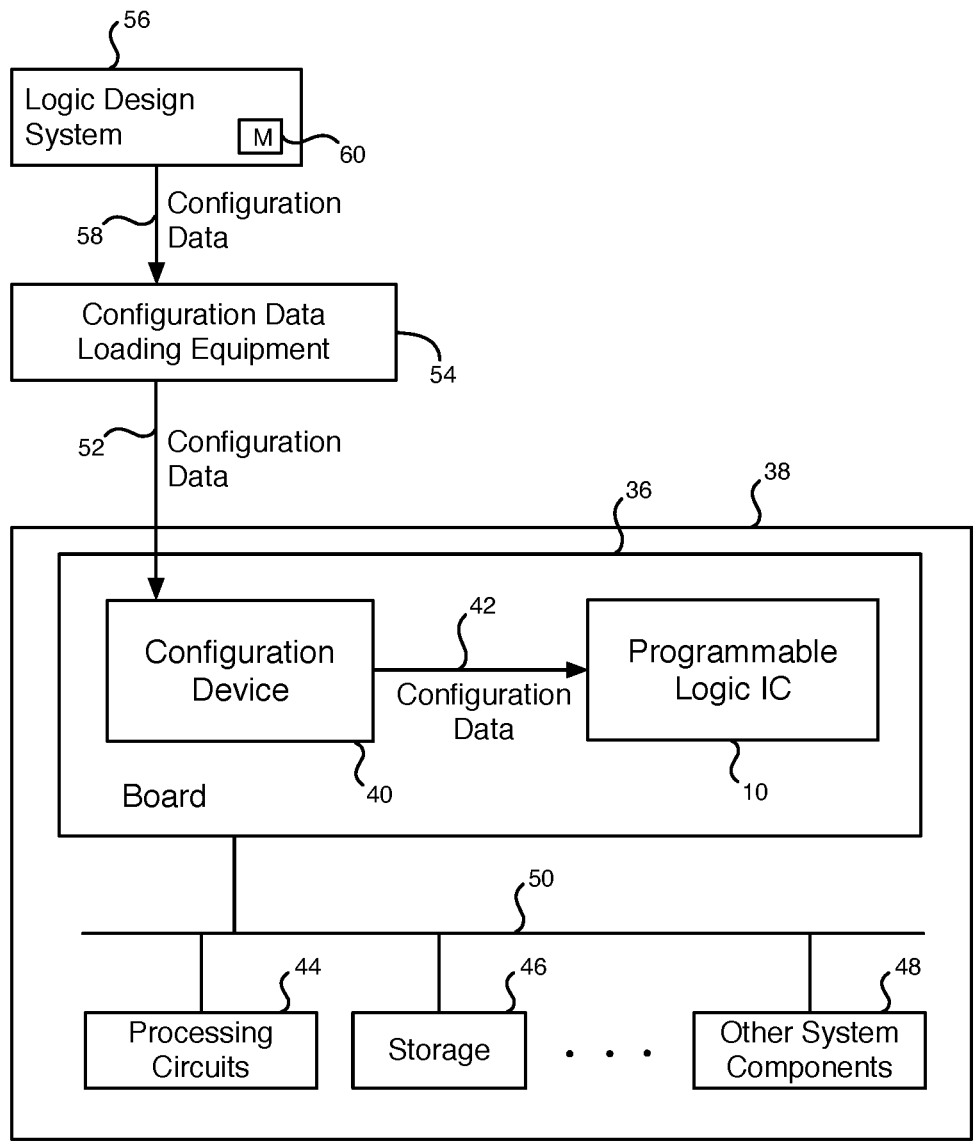
FIG. 6 is a diagram showing how configuration data is created by a logic design system and loaded into a programmable logic integrated circuit (IC) to configure the IC for operation in a system in accordance with an embodiment.

An illustrative system environment for IC 10 is shown in FIG. 6. IC 10 may be mounted on a board 36 in a system 38. In general, programmable logic IC 10 may receive configuration data from programming equipment or from other suitable equipment or device. In the example of FIG. 6, programmable IC 10 is a type of programmable logic device that receives configuration data from an associated configuration device 40. With this type of arrangement, configuration device 40 may, if desired, be mounted on the same board 36 as programmable logic IC 10.

Configuration device 40 may be an erasable-programmable read-only memory (EPROM) chip, a programmable logic device configuration data loading chip with built-in memory, or other suitable device. When system 38 boots up (or at another suitable time), the configuration data for configuring the programmable logic IC 10 may be supplied to the programmable logic IC 10 from device 40, as shown schematically by path 42. The configuration data that is supplied to the programmable logic IC 10 may be stored in the programmable logic IC 10 in its configuration random-access memory elements 20.

System 38 may include processing circuits 44, storage 46, and other system components 48 that communicate with IC 10. The components of system 38 may be located on one or more boards such as board 36 or other suitable mounting structures or housings and may be interconnected by buses, traces, and other electrical paths 50.

Configuration device 40 may be supplied with the configuration data for IC 10 over a path such as path 52. Configuration device 40 may, for example, receive the configuration data from configuration data loading equipment 54 or other suitable equipment that stores this data in configuration device 40. Device 40 may be loaded with data before or after installation on board 36.

In the example of FIG. 6, a logic design system 56 generates the configuration data. The configuration data produced by the logic design system 56 may be provided to equipment 54 over a path such as path 58. The equipment 54 provides the configuration data to device 40, so that device 40 can later provide this configuration data to the programmable logic IC 10 over path 42. Logic design system 56 may be based on one or more computers and one or more software programs. In general, software and data may be stored on any computer-readable medium (storage) in system 56 and is shown schematically as storage 60 in FIG. 6.

In a typical scenario, logic design system 56 is used by a logic designer to create a circuit design for IC 10. The system 56 produces corresponding configuration data that is provided to configuration device 40. Upon power-up, configuration device 40 and data loading circuitry in programmable IC 10 is used to load the configuration data into memory cells 20 of IC 10. IC 10 may then be used in normal operation of system 38.

After IC 10 is initially loaded with a set of configuration data (e.g., using configuration device 40), IC 10 may be reconfigured by loading a different set of configuration data. Sometimes, it may be desirable to reconfigure only a portion of the memory cells in IC 10 via a process referred to as partial reconfiguration. As memory cells are typically arranged in an array, partial reconfiguration can be performed by writing new data values only into selected portion(s) in the array, while leaving portions of the array other than the selected portion(s) in their original state.

It can be a significant undertaking to design and implement a desired (custom) logic circuit design in a programmable logic integrated circuit (IC). Logic designers therefore generally use logic design systems based on computer-aided-design (CAD) tools to assist them in designing circuits. A logic design system can help a logic designer design and test complex circuits for a system. When a circuit design is complete, the logic design system may be used to generate configuration data for electrically programming the appropriate programmable logic IC.

Figure 7:
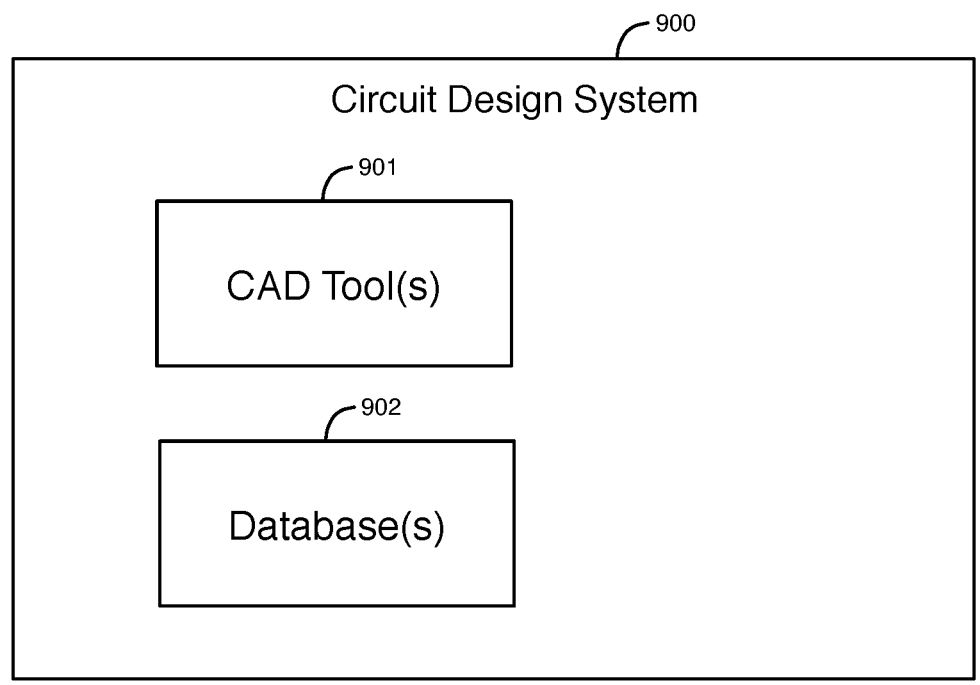
FIG. 7 is a diagram of a circuit design system that may be used to design integrated circuits in accordance with an embodiment.

An illustrative circuit design system 900 in accordance with an embodiment is shown in FIG. 7. If desired, the circuit design system of FIG. 7 may be used in a logic design system such as logic design system 56 shown in FIG. 6. Circuit design system 900 may be implemented on integrated circuit design computing equipment. Circuit design system 900 may, for example, include one or more networked computers with processors, memory, mass storage, input/output devices, etc. System 900 may, for example, be based on one or more processors such as personal computers, workstations, etc. The processor(s) may be linked using a network (e.g., a local or wide area network). Memory in these computers or external memory and storage devices may be used to store instructions and data.

Software-based components such as computer-aided design (CAD) tools 901 and databases 902 reside on system 900. During operation, executable software such as the software of computer aided design tools 901 runs on the processor(s) of system 900. Databases 902 are used to store data for the operation of system 900. In general, software and data may be stored in non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Software stored on the non-transitory computer readable storage media may be executed on system 900. When the software of system 900 is installed, the storage of system 900 has instructions and data that cause the computing equipment in system 900 to execute various methods (processes). When performing these processes, the computing equipment is configured to implement the functions of circuit design system 900.

The computer aided design (CAD) tools 901, some or all of which are sometimes referred to collectively as a CAD tool, a circuit design tool, or an electronic design automation (EDA) tool, may be provided by a single vendor or by multiple vendors. Tools 901 may be provided as one or more suites of tools (e.g., a compiler suite for performing tasks associated with implementing a circuit design in a programmable IC) and/or as one or more separate software components (tools). Database(s) 902 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 8:
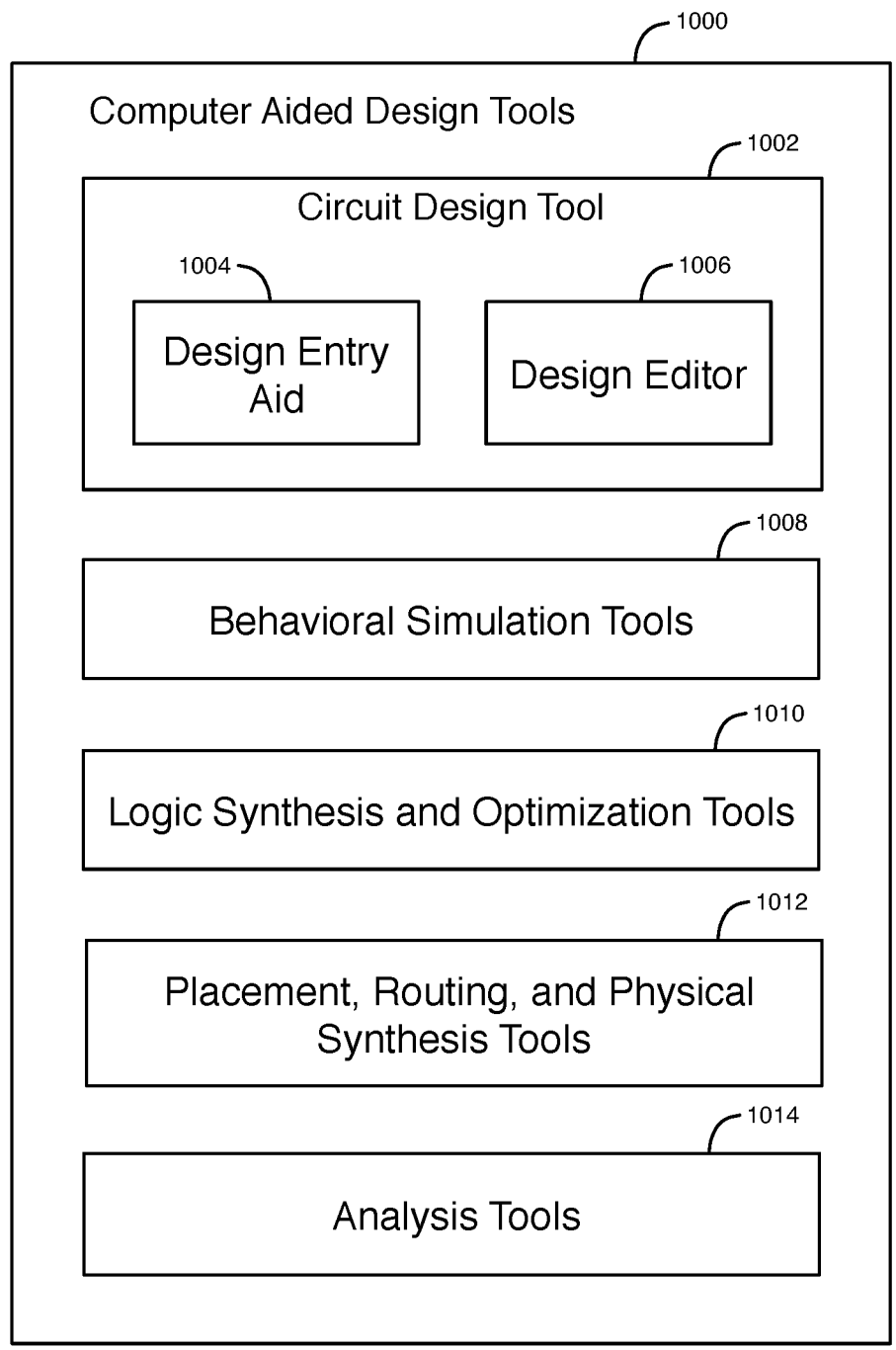
FIG. 8 is a diagram of illustrative computer-aided design (CAD) tools that may be used in a circuit design system in accordance with an embodiment.

Illustrative computer aided design tools 1000 that may be used in a circuit design system such as circuit design system 900 of FIG. 7 are shown in FIG. 8. The design process may start with the formulation of functional specifications of the integrated circuit design (e.g., a functional or behavioral description of the integrated circuit design). A circuit designer may specify the functional operation of a desired circuit design using circuit design tool 1002. Circuit design tool 1002 may include tools such as design and constraint entry aid 1004 and design editor 1006. Design and constraint entry aids such as aid 1004 may be used to help a circuit designer locate a desired design from a library of existing circuit designs and may provide computer-aided assistance to the circuit designer for entering (specifying) the desired circuit design. Circuit design tool 1002 may allow a circuit designer to enter timing constraints for the desired circuit design through aid 1004.

As an example, design and constraint entry aid 1004 may be used to present screens of options for a user. The user may click on on-screen options to select whether the circuit being designed should have certain features. Design editor 1006 may be used to enter a design (e.g., by entering lines of hardware description language code), may be used to edit a design obtained from a library (e.g., using a design and constraint entry aid), or may assist a user in selecting and editing appropriate prepackaged code/designs.

Circuit design tool 1002 may be used to allow a circuit designer to provide a desired circuit design using any suitable format. For example, circuit design tool 1002 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, circuit design tool 1002 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, circuit design tool 1002 may allow the circuit designer to provide a circuit design to the circuit design system 900 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 1006. Blocks of code may be imported from user-maintained or commercial libraries if desired.

After the circuit design has been entered using circuit design tool 1002, behavioral simulation tools 1008 may be used to simulate the functionality of the circuit design. If the functionality of the circuit design is incomplete or incorrect, the circuit designer can make changes to the circuit design using circuit design tool 1002. The functional operation of the new circuit design may be verified using behavioral simulation tools 1008 before synthesis operations have been performed using tools 1010. Simulation tools such as behavioral simulation tools 1008 may also be used at other stages in the design flow if desired (e.g., after logic synthesis). The output of the behavioral simulation tools 1008 may be provided to the circuit designer in any suitable format (e.g., truth tables, timing diagrams, etc.).

Once the functional operation of the circuit design has been determined to be satisfactory, logic synthesis and optimization tools 1010 may generate a gate-level netlist of the circuit design, for example, using gates from a particular library pertaining to a targeted process supported by a foundry that has been selected to produce the integrated circuit. Alternatively, logic synthesis and optimization tools 1010 may generate a gate-level netlist of the circuit design using gates of a targeted programmable IC (i.e., in the logic and interconnect resources of a particular programmable IC product or product family).

Logic synthesis and optimization tools 1010 may optimize the circuit design by making appropriate selections of hardware to implement different logic functions in the circuit design based on the circuit design data and constraint data entered by the logic designer using tool 1002. As an example, logic synthesis and optimization tools 1010 may perform multi-level logic optimization and technology mapping based on the length of a combinational path between registers in the circuit design and corresponding timing constraints that were entered by the logic designer using tool 1002.

After logic synthesis and optimization using tools 1010, the circuit design system 900 may use tools such as placement, routing, and physical synthesis tools 1012 to perform physical design steps (layout synthesis operations). Tools 1012 can be used to determine where to place each gate of the gate-level netlist produced by tools 1010. For example, if two counters interact with each other, tools 1012 may locate these counters in adjacent regions to reduce interconnect delays or to satisfy timing requirements specifying the maximum permitted interconnect delay. Tools 1012 create orderly and efficient implementations of circuit designs for any targeted integrated circuit (e.g., for a given programmable integrated circuit such as a field-programmable gate array (FPGA)).

Tools such as tools 1010 and 1012 may be part of a compiler suite (e.g., part of a suite of compiler tools provided by a programmable IC vendor). In certain embodiments, tools such as tools 1010, 1012, and 1014 may also include timing analysis tools. The timing analysis tools allow tools 1010 and 1012 to satisfy performance requirements (e.g., timing requirements) before producing the integrated circuit.

After an implementation of the desired circuit design has been generated using tools 1012, the implementation of the design may be analyzed and tested using analysis tools 1014. For example, analysis tools 1014 may include timing analysis tools, power analysis tools, or formal verification tools, just to name few.

After satisfactory optimization operations have been completed using tools 1000 and depending on the targeted integrated circuit technology, tools 1000 may produce a mask-level layout description of the integrated circuit or configuration data for programming the programmable logic IC.

The following examples pertain to further embodiments. Example 1 is a method for generating a circuit design for an integrated circuit using a circuit design tool, the method comprising: determining maximum junction temperatures for circuit blocks in the circuit design for the integrated circuit; determining defects values for the circuit blocks using the maximum junction temperatures for the circuit blocks; determining a defects value for the circuit design based on the defects values for the circuit blocks; and determining a maximum junction temperature for the circuit design based on a comparison between the defects value for the circuit design and a target defects value for the circuit design.

In Example 2, the method of Example 1 may optionally include, wherein determining the maximum junction temperatures for the circuit blocks further comprises adjusting the maximum junction temperatures for at least a subset of the circuit blocks.

In Example 3, the method of any one of Examples 1-2 may optionally further comprise: placing and routing the circuit design to generate a placement and routing for the circuit design; identifying hot spots in the placement and routing for the circuit design based on the maximum junction temperatures for circuit blocks; and identifying portions of the circuit design that are larger contributors to the defects value for the circuit design based on the hot spots.

In Example 4, the method of Example 3 may optionally further comprise: determining if there are changes to the placement and routing for the circuit design that reduce temperatures of the hot spots in the circuit design; and performing the changes to the placement and routing for the circuit design to reduce the temperatures of the hot spots in the circuit design.

In Example 5, the method of Example 4 may optionally further include, wherein performing the changes to the placement and routing for the circuit design further comprises adjusting the placement and routing for the circuit design using a weighting mechanism that attempts to reduce thermal and power density in the circuit design while maintaining placement and routing requirements for the circuit design.

In Example 6, the method of Example 3 may optionally further comprise: determining if there are changes to the placement and routing for the circuit design that reduce the defects values for the circuit blocks; and performing the changes to the placement and routing for the circuit design to reduce the defects values for the circuit blocks.

In Example 7, the method of any one of Examples 1-6 may optionally further include, wherein determining the maximum junction temperatures for the circuit blocks further comprises increasing the maximum junction temperatures for a first subset of the circuit blocks and decreasing the maximum junction temperatures for a second subset of the circuit blocks to cause the integrated circuit to allow the maximum junction temperatures for the first subset of the circuit blocks to be greater than the maximum junction temperature for the circuit design.

In Example 8, the method of any one of Examples 1-7 may optionally further include, wherein determining the defects value for the circuit design further comprises determining the defects value for the circuit design and determining power usage for the circuit design based on a lifetime parameter for the circuit design and the maximum junction temperatures for the circuit blocks.

In Example 9, the method of any one of Examples 1-8 may optionally include, wherein determining the maximum junction temperature for the circuit design further comprises: determining maximum junction temperatures for multiple integrated circuit dies in a package based on defects values for the integrated circuit dies in the package.

Example 10 is a non-transitory computer readable storage medium comprising instructions stored thereon for causing a computer to execute a method for generating a circuit design for an integrated circuit using a circuit design tool, the method comprising: placing and routing the circuit design to generate a placement and routing for the circuit design; determining maximum junction temperatures and defects values for circuit blocks in the circuit design for the integrated circuit; identifying hot spots in the placement and routing for the circuit design based on the maximum junction temperatures for the circuit blocks; identifying portions of the circuit design that are larger contributors to the defects values based on the hot spots; determining if there are changes to the placement and routing for the circuit design that reduce temperatures of the hot spots; and performing the changes to the placement and routing for the circuit design to reduce the temperatures of the hot spots.

In Example 11, the non-transitory computer readable storage medium of Example 10 may optionally include, wherein performing the changes to the placement and routing for the circuit design further comprises adjusting the placement and routing for the circuit design using a weighting mechanism that attempts to reduce thermal and power density in the circuit design while maintaining placement and routing requirements for the circuit design.

In Example 12, the non-transitory computer readable storage medium of any one of Examples 10-11 may optionally include, wherein the method further comprises: providing thermal cooling to areas of the circuit design that generate high power density.

In Example 13, the non-transitory computer readable storage medium of any one of Examples 10-12 may optionally include, wherein performing the changes to the placement and routing for the circuit design further comprises performing the changes to the placement and routing for the circuit design using fast partial reconfiguration in a programmable logic integrated circuit.

In Example 14, the non-transitory computer readable storage medium of any one of Examples 10-13 may optionally include, wherein the method further comprises: adjusting aging parameters for the integrated circuit to improve power usage and performance of the circuit design based on a reliability calculation that uses the defects values for the circuit blocks.

In Example 15, the non-transitory computer readable storage medium of any one of Examples 10-14 may optionally include, wherein performing the changes to the placement and routing for the circuit design further comprises performing the changes to the placement and routing for the circuit design to reduce power density in the circuit design and to increase circuit performance in the circuit design using partial reconfiguration in a programmable logic integrated circuit.

Example 16 is a circuit design system configured to generate a circuit design for an integrated circuit, the circuit design system comprising: a placement and routing tool for placing and routing the circuit design to generate a placement and routing for the circuit design; and a circuit design tool for determining maximum junction temperatures and defects values for circuit blocks in the circuit design for the integrated circuit, for identifying hot spots in the placement and routing for the circuit design based on the maximum junction temperatures for the circuit blocks, and for identifying portions of the circuit design that are larger contributors to the defects values based on the hot spots; wherein the circuit design tool determines if there are changes to the placement and routing for the circuit design that reduce the defects values for the circuit blocks, and wherein the placement and routing tool performs the changes to the placement and routing for the circuit design to reduce the defects values for the circuit blocks.

In Example 17, the circuit design system of Example 16 may optionally include, wherein the circuit design tool adjusts the maximum junction temperatures for at least a subset of the circuit blocks to adjust memory capacity in the subset of the circuit blocks.

In Example 18, the circuit design system of any one of Examples 16-17 may optionally include, wherein the circuit design tool determines maximum junction temperatures for multiple integrated circuit dies in an integrated circuit package based on defects values for the integrated circuit dies in the integrated circuit package.

In Example 19, the circuit design system of any one of Examples 16-18 may optionally include, wherein the circuit design tool adjusts the placement and routing for the circuit design using a weighting mechanism that attempts to reduce thermal and power density in the circuit design while maintaining placement and routing requirements for the circuit design.

In Example 20, the circuit design system of any one of Examples 16-19 may optionally include, wherein the circuit design tool determines a defects value for the circuit design based on the defects values for the circuit blocks, and wherein the circuit design tool determines a maximum junction temperature for the circuit design based on a comparison between the defects value for the circuit design and a target defects value for the circuit design.

In Example 21, the circuit design system of Example 18 may optionally include, wherein the integrated circuit dies are coupled together in a three dimensional stack or through an interposer that is one of a substrate interposer, an active silicon interposer, or passive silicon interposer.

The foregoing description of the exemplary embodiments has been presented for the purpose of illustration. The foregoing description is not intended to be exhaustive or to be limiting to the examples disclosed herein. The foregoing is merely illustrative of the principles of this disclosure and various modifications can be made by those skilled in the art. The foregoing embodiments may be implemented individually or in any combination.

What is claimed is:

1. A non-transitory computer readable storage medium comprising instructions stored thereon for causing a computer to execute a method for generating a circuit design for an integrated circuit using a circuit design tool, the method comprising:
    placing and routing the circuit design to generate a placement and routing for the circuit design;
    determining maximum junction temperatures and defects values for circuit blocks in the circuit design for the integrated circuit;
    identifying hot spots in the placement and routing for the circuit design based on the maximum junction temperatures for the circuit blocks;
    identifying portions of the circuit design that are larger contributors to the defects values based on the hot spots;
    determining if there are changes to the placement and routing for the circuit design that reduce temperatures of the hot spots; and
    performing the changes to the placement and routing for the circuit design to reduce the temperatures of the hot spots.

2. The non-transitory computer readable storage medium of claim 1, wherein performing the changes to the placement and routing for the circuit design further comprises adjusting the placement and routing for the circuit design using a weighting mechanism that attempts to reduce thermal and power density in the circuit design while maintaining placement and routing requirements for the circuit design.

3. The non-transitory computer readable storage medium of claim 1, wherein the method further comprises:
    providing thermal cooling to areas of the circuit design that generate high power density.

4. The non-transitory computer readable storage medium of claim 1, wherein performing the changes to the placement and routing for the circuit design further comprises performing the changes to the placement and routing for the circuit design using fast partial reconfiguration in a programmable logic integrated circuit.

5. The non-transitory computer readable storage medium of claim 1, wherein the method further comprises:
    adjusting aging parameters for the integrated circuit to improve power usage and performance of the circuit design based on a reliability calculation that uses the defects values for the circuit blocks.

6. The non-transitory computer readable storage medium of claim 1, wherein performing the changes to the placement and routing for the circuit design further comprises performing the changes to the placement and routing for the circuit design to reduce power density in the circuit design and to increase circuit performance in the circuit design using partial reconfiguration in a programmable logic integrated circuit.

7. The non-transitory computer readable storage medium of claim 1, wherein the method further comprises adjusting the maximum junction temperatures for at least a subset of the circuit blocks to adjust memory capacity in the subset of the circuit blocks, wherein the integrated circuit is a programmable logic integrated circuit.

8. The non-transitory computer readable storage medium of claim 1, wherein the method further comprises determining additional maximum junction temperatures for multiple integrated circuit dies in an integrated circuit package based on additional defects values for the integrated circuit dies in the integrated circuit package.

9. The non-transitory computer readable storage medium of claim 8, wherein the integrated circuit dies are coupled together in a three dimensional stack or through an interposer that is one of a substrate interposer, an active silicon interposer, or passive silicon interposer.

10. The non-transitory computer readable storage medium of claim 1, wherein the method further comprises:
    determining a defects number for the circuit design based on the defects values for the circuit blocks; and
    determining a maximum junction temperature for the circuit design based on a comparison between the defects number for the circuit design and a target defects number for the circuit design.

11. A circuit design system configured to generate a circuit design for an integrated circuit, the circuit design system comprising:
    a placement and routing tool for placing and routing the circuit design to generate a placement and routing for the circuit design; and
    a circuit design tool for determining maximum junction temperatures and defects values for circuit blocks in the circuit design for the integrated circuit, for identifying hot spots in the placement and routing for the circuit design based on the maximum junction temperatures for the circuit blocks, and for identifying portions of the circuit design that are larger contributors to the defects values based on the hot spots;
    wherein the circuit design tool determines if there are changes to the placement and routing for the circuit design that reduce the defects values for the circuit blocks, and
    wherein the placement and routing tool performs the changes to the placement and routing for the circuit design to reduce the defects values for the circuit blocks.

12. The circuit design system of claim 11, wherein the circuit design tool adjusts the maximum junction temperatures for at least a subset of the circuit blocks to adjust memory capacity in the subset of the circuit blocks, and wherein the integrated circuit is a programmable logic integrated circuit.

13. The circuit design system of claim 11, wherein the circuit design tool determines maximum junction temperatures for multiple integrated circuit dies in an integrated circuit package based on defects values for the integrated circuit dies in the integrated circuit package.

14. The circuit design system of claim 13, wherein the integrated circuit dies are coupled together in a three dimensional stack or through an interposer that is one of a substrate interposer, an active silicon interposer, or passive silicon interposer.

15. The circuit design system of claim 11, wherein the circuit design tool adjusts the placement and routing for the circuit design using a weighting mechanism that attempts to reduce thermal and power density in the circuit design while maintaining placement and routing requirements for the circuit design.

16. The circuit design system of claim 11, wherein the circuit design tool determines a defects value for the circuit design based on the defects values for the circuit blocks, and wherein the circuit design tool determines a maximum junction temperature for the circuit design based on a comparison between the defects value for the circuit design and a target defects value for the circuit design.

17. The circuit design system of claim 11, wherein the placement and routing tool performs the changes to the placement and routing for the circuit design using fast partial reconfiguration in a programmable logic integrated circuit.

18. The circuit design system of claim 11, wherein the placement and routing tool performs the changes to the placement and routing for the circuit design to reduce power density in the circuit design and to increase circuit performance in the circuit design using partial reconfiguration in a programmable logic integrated circuit.

19. The circuit design system of claim 11, wherein the circuit design tool adjusts aging parameters for the integrated circuit to improve power usage and performance of the circuit design based on a reliability calculation that uses the defects values for the circuit blocks.

20. The circuit design system of claim 11, wherein the circuit design tool provides thermal cooling to areas of the circuit design that generate high power density.

\* \* \* \* \*